United States Patent

[11] 3,632,261

[72] Inventors: Joseph Gasior
Bloomfield, N.J.;
Charles J. Waechter, Wayland, Mass.
[21] Appl. No.: 859,894
[22] Filed: Sept. 22, 1969
[45] Patented: Jan. 4, 1972
[73] Assignee: Midland Ross Corporation
Cleveland, Ohio

[54] CONTINUOUS-PARISON BLOW-MOLDING MACHINE
9 Claims, 13 Drawing Figs.

[52] U.S. Cl. .................................................. 425/292,
425/297, 425/305, 425/315, 425/342, 425/387
[51] Int. Cl. .................................................. B29d 23/04
[50] Field of Search .......................................... 18/5 BB, 5
BC, 5 BQ, 5 BT, 5 BP, 12 DH, 12 R, 14 A

[56] References Cited
UNITED STATES PATENTS
3,035,302  5/1962  Lysobey ................ 18/5 BP X
3,473,192  10/1969  Martelli ................ 18/5 BP FOREIGN PATENTS
746,404  11/1966  Canada ................ 18/5 BB Primary Examiner—H. A. Kilby, Jr.
Attorneys—Woodrow W. Portz and Irvin L. Groh ABSTRACT: A high-production machine for blow molding articles, such as plastic bottles, from sections of a continuously extruded parison wherein the parison is received in a succession of concurrently moving, cyclically returned preliminary or "preform" molds into each of which a section of parison is received, advanced into enveloping relation with a transfer pin, and then severed and formed into a closed-end "cell" while in transit. In this machine, one or more transfer pins cooperate with the preform molds to close the ends and otherwise partly shape successive parison sections or cells. Each preliminarily shaped cell is shifted by a transfer pin from the reciprocal ambit of the preform mold to a position wherein it is embraced by a final blow mold or one of a plurality thereof. The transfer pin has important functions in cooperation with the molds in shaping the necks and closed ends of the finished blow-molded articles without the formation of scrap fragments.

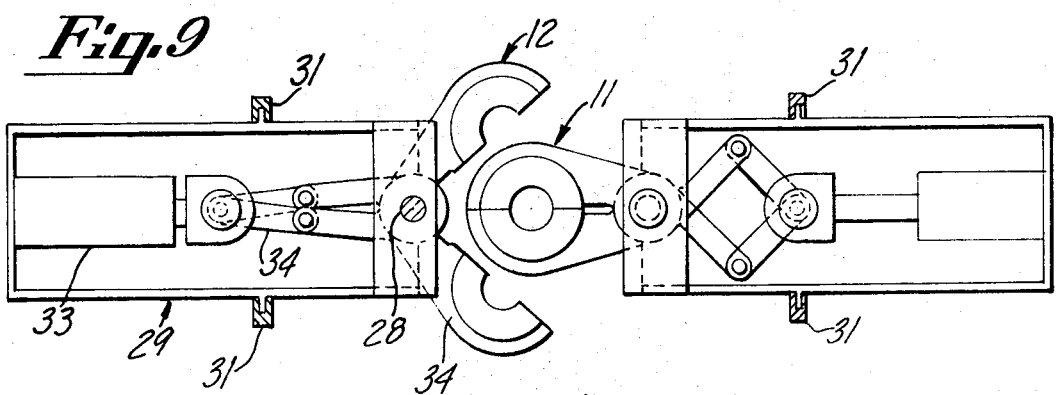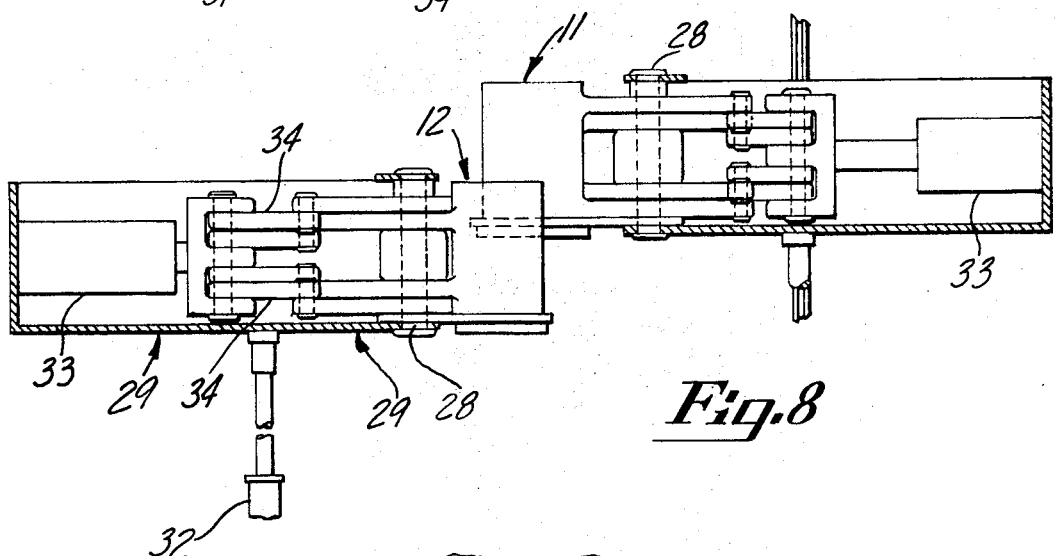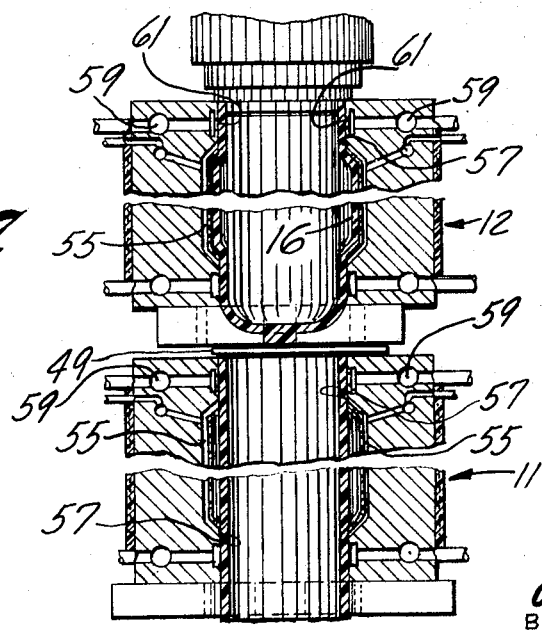

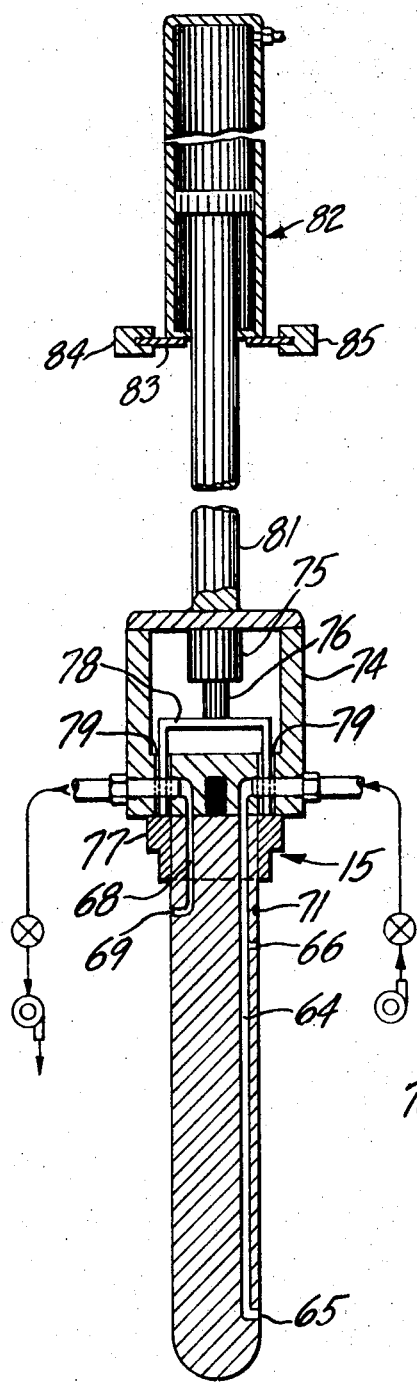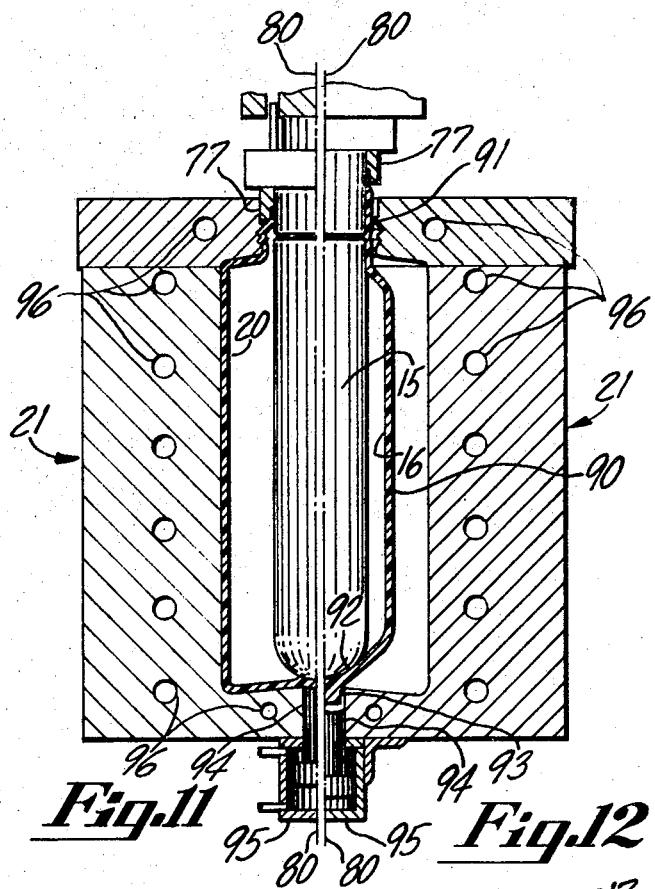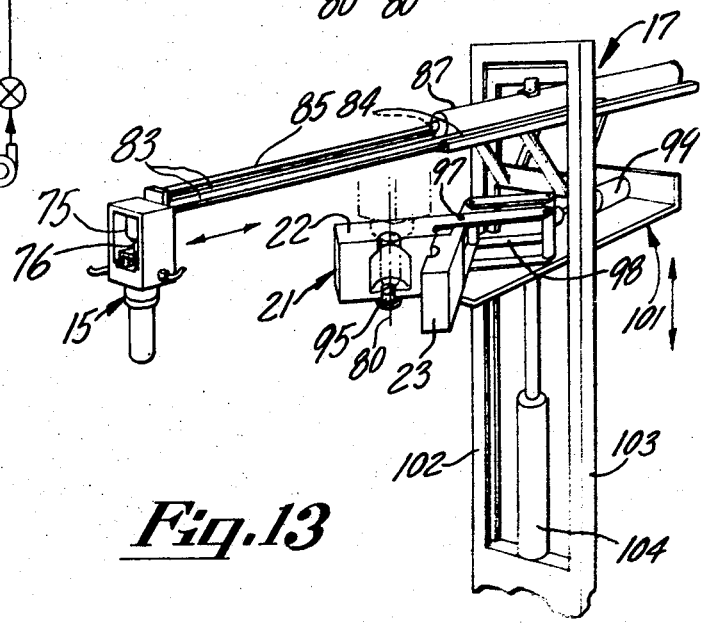

CONTINUOUS-PARISON BLOW-MOLDING MACHINE

DESCRIPTION

In conventional molding operations, it is difficult to avoid the formation of flash, pinchoff, and other forms of plastic water, principally because of a lack of machinery which will apportion a parison issuing continuously from an extruder into the precise quantities needed for the articles to be formed, and then to so confine and enforce distribution of the allocated material, particularly at the ends of the articles, as to cause even distribution of the material within the walls of the article during the blow-molding operation.

As nearly all conventional practices for molding thermoplastic material result in the production of waste plastic, molding costs include not only the the cost of removing the excess material but the cost of recycling the excess material, or in the case of heat-degradable plastics such as vinyl chloride, the cost of scrapping a certain percentage of the molding composition. In the instance wherein containers and closures must establish a contaminationproof seal, neck finishing is frequently necessary.

Hence, essential objects of the invention are: (1) the provision of apparatus wherein blow molding of articles may be accomplished without accompanying excess material thus avoiding trimming operations, and recycling or scrapping of such excess material; (2) to achieve efficiencies in time and equipment over intermittent extruder operation, or combined extruder and accumulator operation; and (3) to improve quality control by equipment which may, without any loss of economy, use only virgin materials and may operate at unvarying uniform conditions of parison formation.

To achieve the above and other objects of the invention, apparatus is provided in the form (1) extruder means associated with a driving means capable of discharging a continuous parison of heated thermoplastic material along a desired axis at substantially uniform liner rates; (2) a parison-receiving combine comprising a plurality of, e.g., two "preform" molds, and supporting apparatus therefor for alternately reciprocating the preform molds along the parison axis. Each preform mold preferably includes a severing member which may swing across the parison path, and contracting end-closing mechanism carried on the end of the preform mold nearest the extruder. These components are so operated in timed relation that each preform mold closes over a section of parison and advances concurrently therewith to establish sufficient clearance with the extruder to enable another preform mold to close over a less advanced section of the parison in immediate rearward juxtaposition with the more advanced preform mold. Meanwhile, a transfer pin has moved countercurrently into the more advanced preform mold until fully inserted and then reverses to move concurrently with the advanced mold. At that instant the severing member severs the parison section within the more advanced mold from the less advanced portion of the parison. The end-closing mechanism pinches the tacky material of the parison section together over the tapered end of the transfer pin to form the closed-end, preliminarily shaped cell. The more advanced preform mold is thereafter opened and returned to a less advanced position while leaving the closed-end, heat-softened plastic cell supported on the transfer pin.

The apparatus further includes a section combine comprising a final blow mold which opens and closes with respect to a generally central axis of its cavity in fixed, preferably parallel, relation with the parison axis. The above-mentioned transfer pin is mounted on a reciprocator capable of traversing the transfer pin along one path into coaxial relation with either the blow mold axis or the parison axis and another path wherein the pin may move in a direction parallel to those axes. The transfer pin reciprocates in the latter direction for the purpose of entering into concurrent coaxial movement with the preform molds while receiving the plastic cells therefrom.

In a preferred embodiment, the transfer pin, the preform molds, and the blow molds are precisely relatively dimensioned so that the pin may cooperate with portions of the preform molds for cutting and sealing one end of a severed cell, and that the pin may cooperate with portions of the final mold in shaping the closed end and the open end of the article being formed and especially in forcing slight excesses of plastic material into substantially even distribution within the walls of the article.

In the drawing to which the following description relates:

FIG. 1 is a fragmentary perspective schematic illustration of machine for producing a parison and blow molding it into finished articles;

FIG. 2 is a chart for depicting the cycles of operation of various mechanisms of the machine of FIG. 1 entering into the operations of producing a continuous parison to closed-end cells and transferring such cells to preform molds; the upper portion of the chart indicates the position of a fixed parison die and relative positions of a pair of preform molds and a transfer pin at the indicated degrees of expiration within a 360° cycle;

FIG. 7 is a view similar to FIG. 4 except that the upper preform mold is shown with its end-closer actuated and the parison section therein preliminarily shaped;

FIGS. 8 and 9 are elevation and plan views, respectively, of a pair of preform molds in relatively moving, vertically overlapped relationship but shown without associated knives and end-closers;

FIG. 10 is a shortened elevation in section of a transfer pin and associated supporting structure;

FIGS. 11 and 12 are fragmentary elevations in section of a blow mold taken along its parting axis with FIG. 12 illustrating the mold at the instant of closing prior to commencement of a blow-molding operation; and with FIG. 11 illustrating the mold at an instant after the blow-molding operation has commenced; and FIG. 13 illustrates a blow-molding and transfer pin combine having alternative mechanism for vertically reciprocating the transfer pin.

The disclosure of the present invention is concerned essentially with the general aspects of method and apparatus for the entire process of forming finished articles from parison sections successively severed and separated from a continuously issuing parison. For simplicity, detailed disclosure of hydraulic and electrical diagrams is not considered essential in claiming the present invention, since, once the motion desired and the nature of the mechanism for accomplishing such is understood, the arrangement of electrical circuits, timing devices, hydraulic valving and the like, are readily available from the electrical and hydraulic arts and within the skill of the skilled mechanic.

While the present invention is described with respect to an apparatus arrangement wherein a parison is extruded upwardly, certain portions of the apparatus may be inverted to adapt the machinery for processing a downwardly extruded parison. This disclosure utilizes simple mechanisms for illustrative purposes in order to present the general aspects of the invention without being involved with structural details entailed in the actual working designs.

Figure 1:
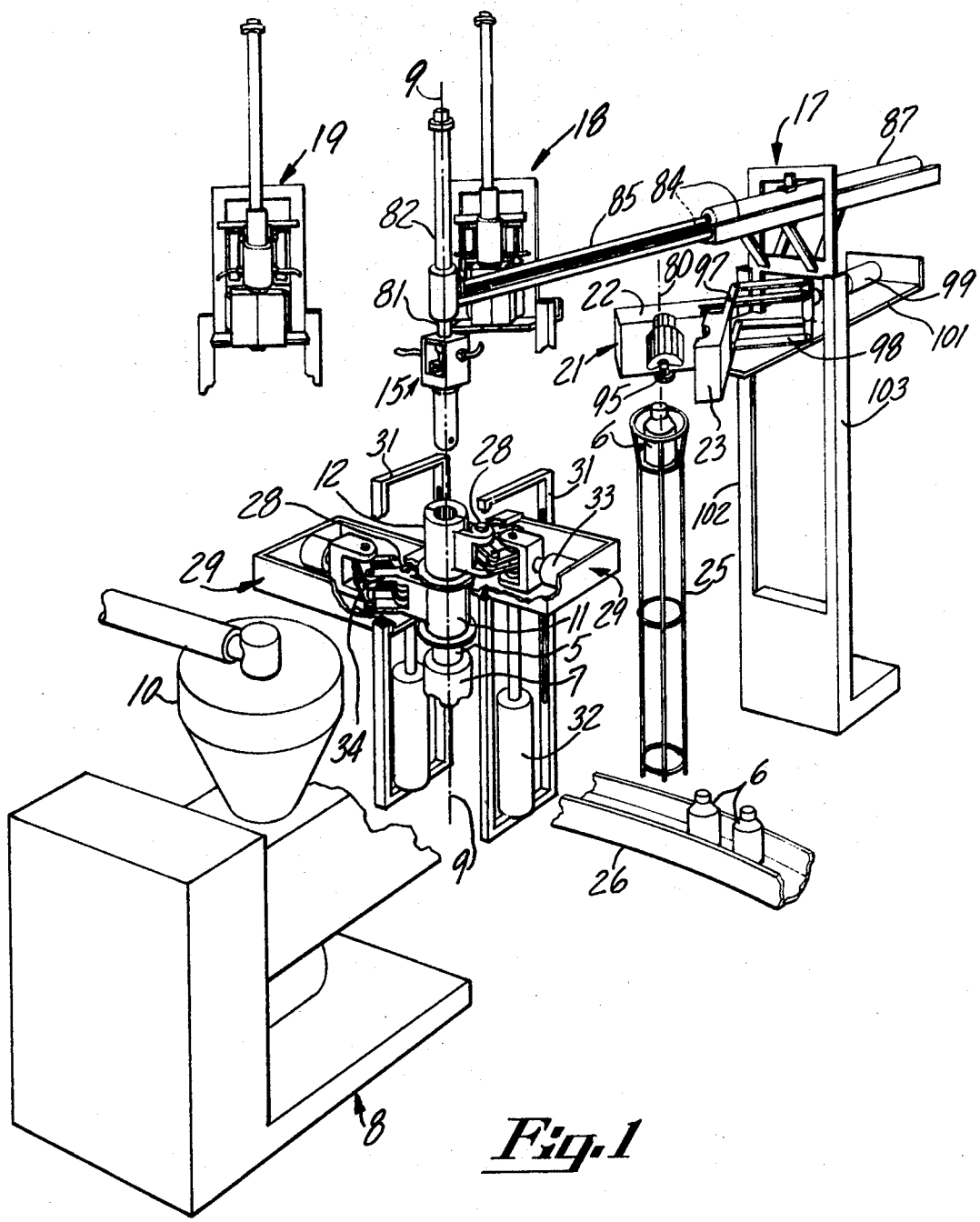

FIG. 1 is a schematic perspective view intended to illustrate, at least fragmentarily, the general arrangement of apparatus for producing and transforming a continuously issuing parison 5 into a succession of articles 6. The parison 5 issues in an upward direction from a die 7 of extruder 8 along a parison axis 9. The extruder 8 is of conventional design suitable for receiving a solid thermoplastic material, usually in the form of pellets, through its feeder 10.

The steadily flowing parison 5 is supported in an upward direction by the movement of a pair of preform molds 11 and 12, which reciprocate lengthwise of the parison axis 9. The molds 11 and 12 and the respective supporting mechanisms are of identical or similar construction and the motions thereof are controlled through identical cycles of equal duration but in sequentially timed relationship.

Figure 2:
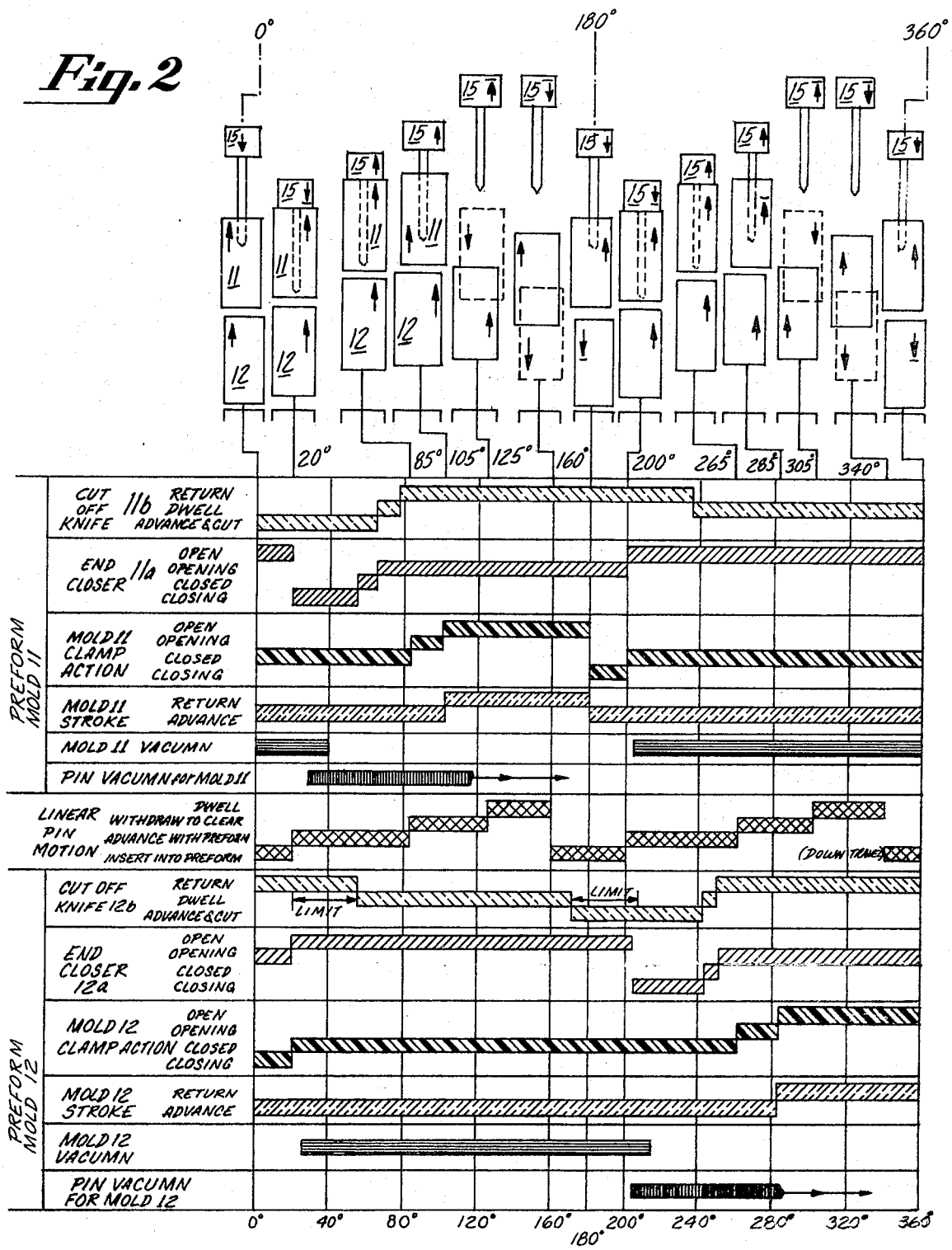

The various motions of apparatus executed along the parison axis 9 are graphically set forth in the chart of FIG. 2. This chart illustrates one complete cycle as measured linearly against time, or 360° of revolution by a rotative member agreeing in timed relation with one cycle of the various mechanisms of the preform combine. An example of such rotative member is a cam rotor (not shown) for actuating various electrical switching devices for controlling relays, valve solenoids, motors, and the like. At the upper side of the chart are shown various positions of the preform molds 11 and 12 and a transfer pin 15 at 0°, 20°, 85°, 105°, 125°, 160°, and 180°. Positions of these elements shown at 200°, 265°, 285°, 305°, 340°, and 360°, show the preform molds in similar but inverse positions as compared with those within the range of 1° to 180°. It will be observed that at 0° and 360°, the elements have returned to identical positions. Most positions of the elements have been offset with their true positions in degrees in order to facilitate illustration on a single page.

The lower major area of the chart is useful to show not only the duration of the different motions of the molds 11, 12 and the pin 15 but also the concurrency of the different movements by the end closures 11a, 12a, and cutoff knives 11b, 12b associated with respective preform molds 11, 12. The chart furthermore includes duration of vacuum applied to preform molds 11 and 12 and at least the commencement of vacuum applied to one or more pins exemplified by pin 15, used for seizure of a preformed plastic cell 16 upon the release thereof by a preform mold near the end of its advance stroke.

As schematically indicated in FIG. 1, the blow-molding machine further comprises a plurality of blow-molding subassemblies or combines 17, 18, and 19, having fixed positions, except for the moving parts thereof, along a circumference in concentric relation with the parison axis 9. While only three blow-molding combines 17,18 and 19 are shown, the machine will ordinarily have more, perhaps as many as a dozen of such combines, arranged concentrically about the parison axis 9 for receiving soft-wall cells 16 from a preform combine such as illustrated comprising, e.g., the two reciprocating preform molds 11 and 12. The ratio of blow-mold combines serving the preform-mold combine depends on such factors as the amount of cooling and time needed to form self-supporting finished articles, and the rate of cooling that can be achieved within the final molds.

In the arrangement shown, wherein each blow-mold combine includes a transfer pin 15, each blow-mold combine performs the functions of (1) receiving and seizing a closed end preformed cell on its respective transfer pin; (2) transferring the cell, while supported on the pin, into the mold 21: (3) shaping the cell, while supported on the pin, into the mold 21; (3) shaping the cell into the final blow-molded article; (4) opening the mold and discharging the article into a receiver, such as the wire chute 25 shown, whereupon the article so discharged may be received by a conveyor 26 shaped to receive articles from the other blow mold combines. The blow mold combine, as arranged in this embodiment, has the further function of traversing its respective transfer pin in a direction parallel to the parison axis, in order that the transfer operation may be synchronized with the movements of the preform molds 11, 12. A further function of the blow mold combine is to finish-form the closed end as well as the open or neck end of the article in order that all the material of a preformed cell may be forced into the structure of the finished article without the formation of any excess fragments which require a trimming operation.

Returning now to the structure of the machine, particularly the preform combine, preform molds 11, 12 are supported by mechanism that can simultaneously open and close the molds while reciprocating them lengthwise of the parison axis 9. The partible halves of the preform molds are shown as extremities of opposed jaw and double toggle-link mechanisms wherein the opposed jaws are pivoted on a pin 28 fixed to a carriage 29 which reciprocates vertically in guide relation with a frame 31. Opening and closing of the partible halves of the preforms 11, 12 is performed by an associated fluid cylinder 33 fixed to the carriage 29 for acting on the preform halves through links 34 (see FIGS. 8 and 9). The carriage 29 is traversed in the vertical direction by reciprocating means, such as a hydraulic cylinder 32, in accordance with the chart of FIG. 2. Operation of cylinder 32 is controlled, e.g., by appropriate conventional valving and cam timing devices (not shown).

Figure 5:
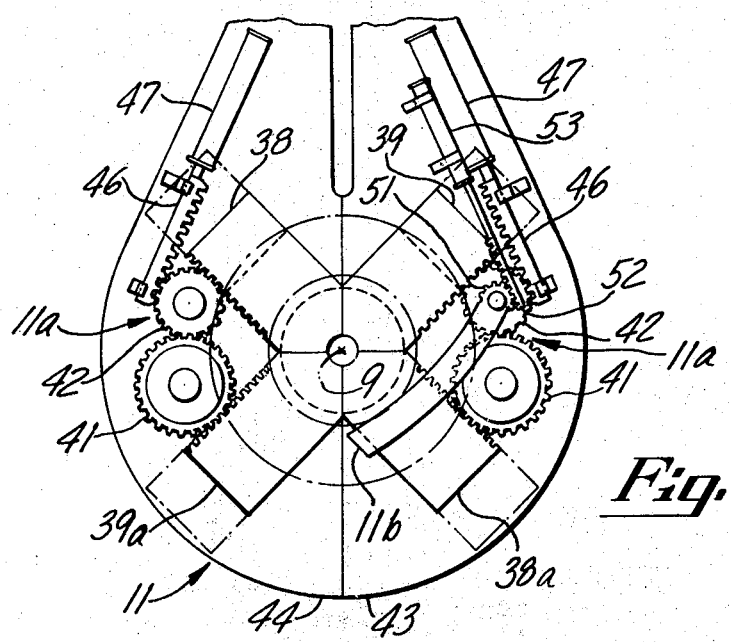
FIG. 5 is a fragmentary underside view of a preform mold illustrating in particular the end-closing and parison-severing mechanisms of a preform mold.
Figure 6:
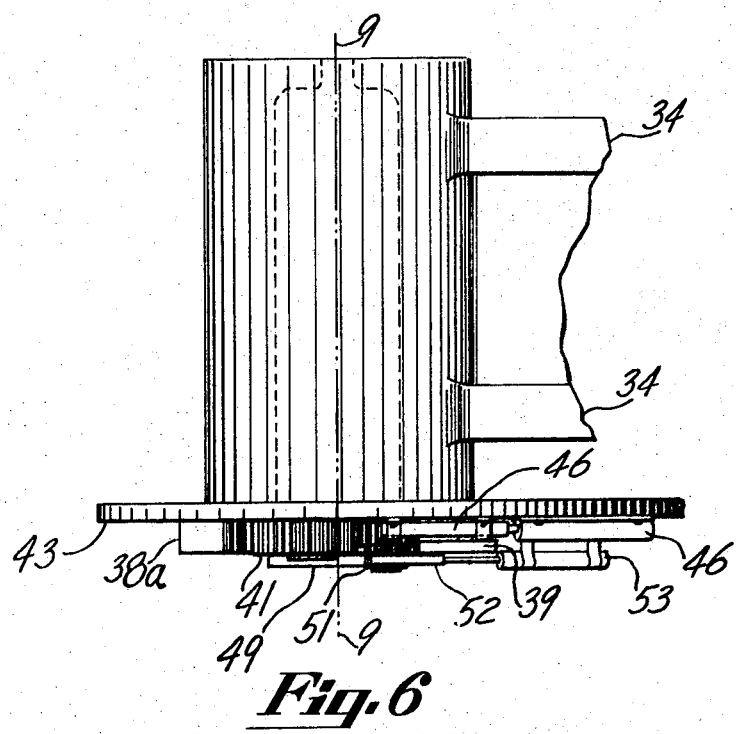
FIG. 6 is a fragmentary elevation view of the preform mold as shown in FIG. 5.

An important function of a preform mold is to sever and shape the end of a parison section in cooperation with the fully inserted transfer pin 15 during a latter portion of the advance stroke of each preform mold. For this purpose, preform molds 11 and 12 comprise end closers 11a, 12a, respectively, and cutoff knives 11b and 12b, respectively, of identical construction. FIGS. 5 and 6 illustrate, for example, that the end closer 11a of preform mold 11 comprises four squeeze bars 38, 38a, 39 and 39a traversed along radii of the parison axis 9 by two sets of intermeshed gears 41, 42 mounted rotatably on mounting plates 43, 44 integral with the preform mold. Outward positions of the bars are indicated in dot-dash outline. Bars 38, 39 have downward-stepped, radially outward portions to clear the rack gears 46. Rack gears 46, each actuated by a fluid cylinder 47 fixed to respective mounting plates 43, 44 are operated simultaneously to either radially retract or advance the bars 38, 39 toward the parison axis. As shown by FIG. 5, the bars 38, 39 of each preform mold half have rack-tooth portions in mesh with one of the gears 41,42.

As parison-severing mechanism, a knife 11b is provided having a circular tooth portion 51 in mesh with a rack gear 52 connected to and actuated by a fluid cylinder 53 fixed to the mounting plate 43. The knife 11b pivots about the axis of rotation of gear 52 and may be supported, as shown, against the underside of the gear 52. The knife preferably is held in engagement with and slides over the undersides of the bars 38,39 in order that a parison section may be severed without any portion thereof extending beyond the associated preform mold. Fluid is valved to the cylinders 47,53 from a pressure source (not shown) in accordance with the chart of FIG. 2. In the operation of preform mold 11, the chart shows that, while the cutoff knife 11b is advancing through its cutting stroke from 0° to approximately 65°, the end closer 11a is closing and remains closed until the knife stroke ends. As the chart further shows, the knife and the end closer begin retraction before unclamping of the partible halves of mold 11 commences (see chart legend, "mold 11 clamp action"). The chart also shows that during the "advance and cut" stroke of the knife 11b and the concurrent "closing" action of the end closer 11a, the pin 15 under the chart legend, "linear pin motion" is in its phase of "advance with preform." That is to say, the pin is fully inserted into, and traveling with, the closed preform mold 11 in the latter part of an advance stroke which commenced at 180° and finishes at 85°. The chart further shows that preform molds 11 and 12 each execute four different motions which are identical in pattern to corresponding motions of the other preform mold but 180° apart in phase. During the 360° of preform mold cycle, there are two complete cycles of linear pin motion of which each is characterized by four different phases.

Figure 4:
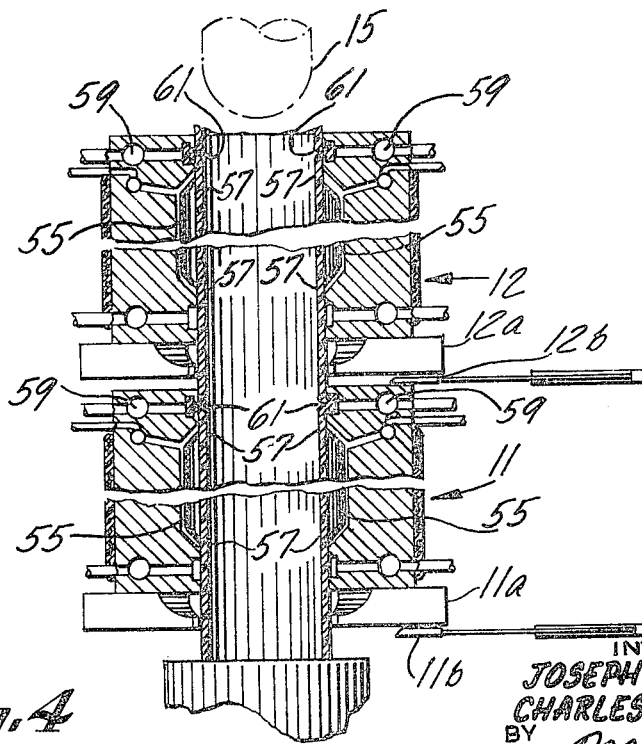
FIG. 4 is a schematic elevation in section taken along the parison axis showing a pair of preform molds in vertical juxtaposition just prior to any severing or preforming operations.

The FIG. 2 chart further indicates the time relationship in the application of vacuum to both preform molds and to any pins cooperating with any preform mold for accomplishing transfer of retention or grip of the preform mold to the pin. As FIGS. 4 and 7 indicate, the walls of the preform molds have ducts 55 opening, for example, at apertures 57 along longitudinally intermediate internal surfaces of preform molds 11,12 at apertures and ducts 59 within end portions of the preform molds having apertures 61 opening along an internal neck surface which support the open ends of the plastic cells into which the transfer pins are inserted. The ducts 55 and 59 are connected with a vacuum source (not shown) by appropriate ducts and valves actuated according to the chart of FIG. 2. Vacuum may be applied to the ducts 55 and 59 simultaneously or selectively as desired. However, ducts 59 and associated apertures 61 have a function which differs from that of ducts 55 and corresponding apertures 57. Vacuum is applied to the apertures 61 primarily for securing parison sections or cells 16 within respective preform molds. Vacuum is applied to apertures 57 through ducts 55 primarily for preforming a parison section received in the corresponding preform mold. Both apertures 61 and 57, when subject to vacuum, have the function of enlarging the received parison section so as to freely receive the transfer pin 15.

As shown in FIG. 10, the transfer pin is constructed with a longitudinal "blow" passageway 64 opening along the exterior surface of the pin at 65, 66. The pin also has a longitudinal vacuum duct 68 opening at 69 into a circumferential groove 71 corresponding longitudinally to the inner surface of a neck portion or other opening-forming end portion of the finished article. The opening 69 and the groove 71 are in general radial alignment with the open end portion of a preform mold, as shown in the upper portion of FIG. 7, when the pin is fully inserted into the preform mold.

In a blow-molding machine according to this invention arranged as herein described for upward parison extrusion, application of vacuum through the pin base to the proximal end portion of the pin enables effective transfer of support of the cell 16 from the preform mold to the pin by proper timing of cessation of vacuum in the preform, i.e., practically simultaneously with the application of vacuum through the pin duct 68 through the duct 68. Support of the cell 16 on the pin 15 is further implemented as vacuum causes the parison section to conform to the groove 71. In this manner, the parison section is effectively locked to the pin during its transfer. Vacuum may be applied and released at the neck portions of preform molds 11 and 12 as shown on FIG. 2 chart. This chart also indicates the proper time for applying vacuum to the pins serving molds 11 and 12. The instant of vacuum release for such pins will be determined by the duration of the transverse stroke for the pin from the preform mold to the blow mold. Thus, the instant of vacuum release within the blow molds of any one of the blow-mold combines, e.g., 17, 18, 19 is not indicated but must occur after the blow mold closes, as shown in FIG. 11.

As shown by FIG. 10, each transfer pin comprises a frame portion 74 in which is housed a fluid cylinder 75 of which its piston pin 76 is connected to an annular neck-finishing sleeve 77 by yoke 78 extending through apertures 79 in the frame portion.

The pin 15 is supported for motion parallel to the parison axis and an axis along which the blow mold served by the pin closes, e.g., along axis 80 of combine 17. As one mode of support, FIG. 10 illustrates that the pin 15 is supported on the piston rod 81 of a fluid cylinder 82. The fluid cylinder is fixed to a slide 83 moving in guide relation with a horizontally aligned guideway 84, which provides an ambit of travel of the pin from the parison axis 9 to the blow-mold axis 80. The fluid cylinder 82 is actuated in accordance with the portion of FIG. 2 chart identified as "linear pin motion." The pin and support assembly is traversed lengthwise of the guideway 84 by the piston rod 85 of cylinder 87 supported in fixed parallel relation with the guideway 84. The operation of cylinder 87 is timed basically in synchronization with the cycle of operation of the preform combine and in a manner to share with the other blow-mold combines, such as combines 18, 19, in the operation of the preform mold combine. The time of successive withdrawals of cells 16 from the preform combine afforded by several blow-mold combines acting sequentially enables leisurely and convenient timing of the operations of the blow-mold combine with its respective transfer pin. Such timing and the number of blow-mold combines will, in general, be controlled by the time needed to obtain a sufficiently cooled self-supporting finished blow-molded article.

FIGS. 11 and 12 illustrate treatment of the soft deformable cell 16 within a blow mold, such as blow mold 21. FIG. 12 illustrates the cell in a preformed condition as received from a preform mold wherein the intermediate portion 90 of the parison has received a partial degree of lateral expansion with the neck portion 91 adherent to the proximal portion of the pin 15 as by vacuum applied to the pin, and the closed end portion 92 shaped with a knot 93 of excess material. The sleeve 77 and a plunger 94 of a fluid cylinder 95 are withdrawn from contact from either end of the parison.

At the instant of closure of the mold 21, appropriate valve means operates to release the vacuum applied to the neck or proximal portion of the pin 15 and air pressure is applied to the blow duct 64 of the pin to accomplish instantaneous inflation of the parison section body. To proceed from the condition of the cell 16 as illustrated in FIG. 12 to that illustrated by FIG. 11, air under pressure enters the duct 64 to commence inflation of the cell 16 and the fluid cylinder 75 is actuated to move the neck-finishing sleeve 77 inwardly of the neck opening of the mold 21. Simultaneously the fluid cylinder 95 is actuated to traverse the plunger 94 inwardly of the bore therefor provided by the combining of semicylindrical grooves in the ends of mold halves 22,23 to act on the knot 93. The plunger 94 completes its stroke during the period of pressure buildup within the molding cavity of the mold 21, thereby distributing the readily deformable knot 93 within the closed end wall portion of the article formed from the parison section 20. The plunger 94 moves to a stopping position placing its distal end at a clearance with the distal end of the pin 15 conforming to a desired end wall thickness of the formed article. If required, a coolant may be circulated through passageway 96 of the mold 21 to cool the article to a self-supporting condition.

After a suitable closing period, such as a few sections, the sleeve 77 and the plunger 94 are retracted, the blow pressure in the mold chamber is reduced to a slight pressure or to atmospheric pressure as needed for article ejection, the mold 21 is opened, and the finished article ejects into the guide 25 wherethrough it is guided into position on a conveyor 26.

Figure 3:
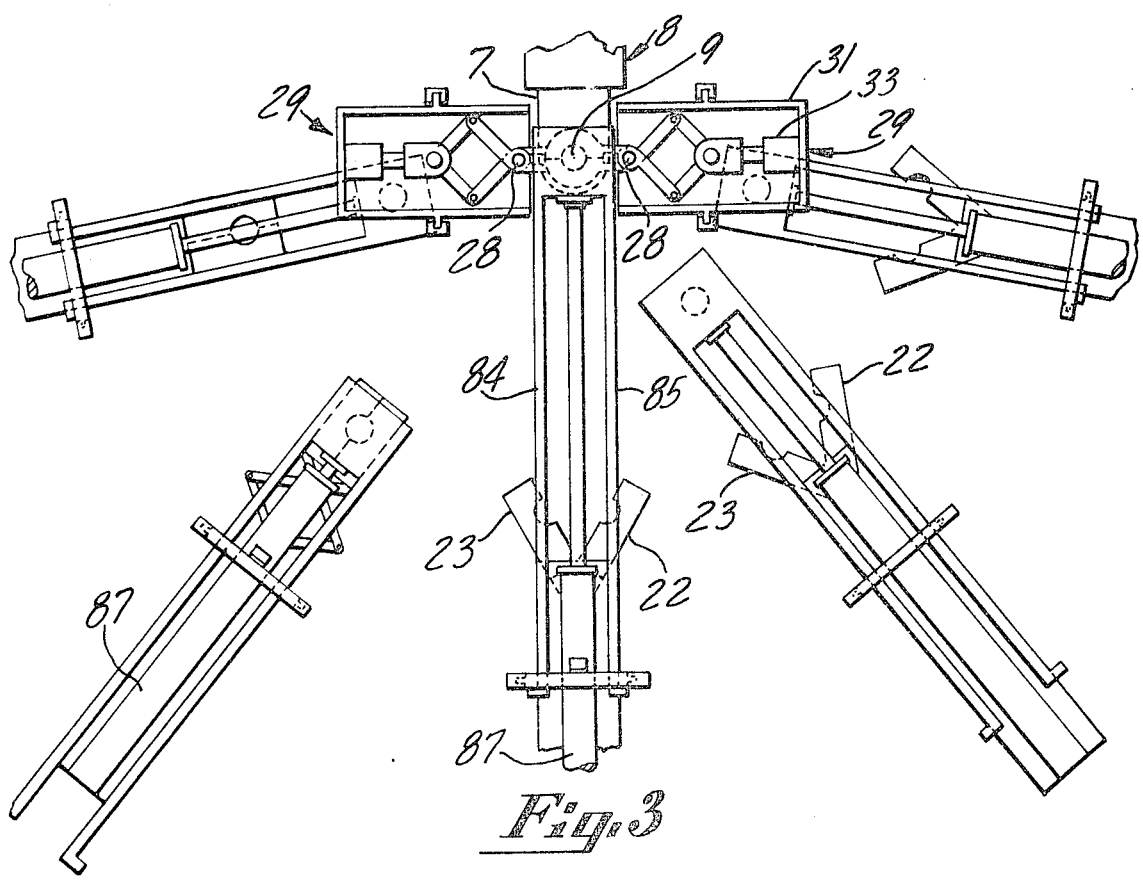
FIG. 3 is a fragmentary schematic plan view of a plurality of blow-mold and transfer combines relative to a parison axis.

It will be noted from FIGS. 1 and 3 that the mold 21 is opened and closed by a mechanism wherein the partible halves 22, 23 are in angled relation with bellcrank portions 97, 98, respectively, connected by toggle links to a piston rod of a fluid cylinder 99 fixed to the frame of the blow-mold preform 17.

In constructing a machine to accomplish the various motions and operations accomplished by the machine described above, alternatives in the way of different types of linear motion devices are readily available to the skilled mechanic and are considered in the purview of this invention. For example, as shown in FIG. 13, the fluid cylinder 82 of FIG. 10 may be eliminated, and the pin frame portion 74 fixed directly to a member, such as the slide 83. The guide 84, the cylinder 87, and the mold 21 are then integralized with a carriage 101 made reciprocable in a vertical direction in guide relation with vertical frame members 102, 103. The carriage 101 then is traversable in a vertical direction by a fluid cylinder 104 controlled in the same cyclical manner as cylinder 82 of the earlier described embodiment.

What is claimed is:

1. Apparatus for treating successive sections of a parison advancing generally along a predetermined parison axis comprising:
    a plurality of perform molds, each comprising partible halves which define a molding cavity when closed;
    separate support means separately reciprocal for supporting each preform mold and sequentially in guide relation with a fixed guideway therefor transporting the associated mold through advance strokes along said parison axis in the same direction as parison advancement, and through return strokes to a position for beginning an advance stroke, each of said support means including means for parting and closing said halves;

control and power means for actuating the support means, said control and power means reciprocating each support means through said strokes, parting the halves of the associated preform mold at the completion of an advance stroke, and reversibly transversing the support means lengthwise of said guide means through a return movement while causing another of said support means to close the mold associated therewith at the beginning of its advance stroke and to proceed with said advance stroke, said supporting means and said control and power means maintaining any mold in a return stroke in the clear of a mold disposed in an advance stroke;

means for severing the parison between molds disposed in closed condition and in juxtaposition along said parison axis.

2. The apparatus of claim 1 wherein said control means and supporting means are arranged and constructed to pass any mold disposed in an advance stroke between parted halves of a mold in its return stroke.

3. The apparatus of claim 1 comprising:

vacuum means actuated by said control means, said halves having ducts opening along said cavity and connecting with said vacuum means.

4. The apparatus of claim 1 comprising:

a plurality of combines, each combine comprising one of said preform molds and its respective supporting means, and said severing means.

5. The apparatus of claim 1 comprising:

a plurality of combines, each combine comprising one of said preform molds and its respective supporting means, and said severing means, the severing means being operable by said control means to sever a section of parison from a section of parison received in an adjacent similar combine disposed in a less advanced portion of its advance stroke.

6. The apparatus of claim 1 comprising:

a plurality of combines, each combine comprising one of said supporting means, one of said preform molds, and said severing means, said severing means being movable through said parison axis in a plane in juxtaposed relation with an end of said mold, said control means being operable to maintain a combine completing its advance stroke and another combine in less advanced position along its advance stroke in substantially end-to-end engagement except for the severing means therebetween during a severing operation.

7. The apparatus of claim 1 comprising:

a plurality of combines, each combine comprising one of said preform molds and its respective supporting means;

said preform mold comprising an end-closer having elements carried on each half comprising elements movable inwardly toward the parison axis relative to respective halves and responsive to said control means at closure of the preform mold to compact an end portion of a parison section into a knot; and said severing means being supported in axial juxtaposition with said end-closer for movement along the path of advancement of said perform molds, and being connected with, and responsive to, said control means to move transversely of the parison axis to sever the parison between two axially advancing juxtaposed preform molds.

8. The apparatus of claim 7 wherein:

said partible halves each comprise a body portion, and each preform mold includes said severing means mounted on the exterior of the body portion.

9. The apparatus of claim 1 comprising:

a plurality of preform combines, each combine comprising one of said preform molds, and said preform mold comprising parison-closing means in each half disposed at the end of the mold toward which the parison is traveling and having elements movable inwardly toward the parison axis relative to respective halves to compact an end portion of a parison section into a knot, and severing means movably supported within each combine in axially juxtaposed relation with said elements, said severing means being movable transversely of said axis to cut the parison adjacent said knot; and a transfer combine comprising a transfer pin having a longitudinal axis, means for traversing the pin from a position in substantially coaxial relation with the parison axis to a position in laterally spaced relation with said axis, and means for traversing said pin lengthwise of said parison axis while maintaining said pin in said coaxial relation.

* * * * *

PO-1050
(5/69)

UNITED STATES PATENT OFFICE
CERTIFICATE OF CORRECTION

Patent No. 3,632,261            Dated January 4, 1972

Inventor(s) Joseph Gasior et al

It is certified that error appears in the above-identified patent and that said Letters Patent are hereby corrected as shown below:

Column 1, line 3, "water" should be -- waste --; eliminate "the" after "only" in line 12; line 30, insert -- of -- before "(1)"; line 58, change "section" to -- second --.

Column 3, line 24, change "1o" to -- 0° --; lines 59 and 60, eliminate "(3) shaping the cell, while supported on the pin, into the mold 21".

Column 5, line 36, eliminate "through the duct 68."

Column 6, line 38, change "sections" to -- seconds --; line 69, change "perform" to -- preform --; line 71, insert a comma after "separate" and eliminate "support means"; after "reciprocal" insert -- support means in guide relation with a fixed guideway therefor --; line 72, after "sequentially" eliminate "in guide relation with a fixed guideway therefor".

Column 7, line 8, change "transversing" to -- traversing --.

Column 8, line 17, change "perform" to -- preform --.

Signed and sealed this 6th day of June 1972.

(SEAL)
Attest:

EDWARD M. FLETCHER, JR.          ROBERT GOTTSCHALK
Attesting Officer                      Commissioner of Patents